March 27, 1928.  1,663,992
J. F. O'CONNOR
FRICTION SHOCK ABSORBING MECHANISM
Original Filed July 21, 1924   2 Sheets-Sheet 2
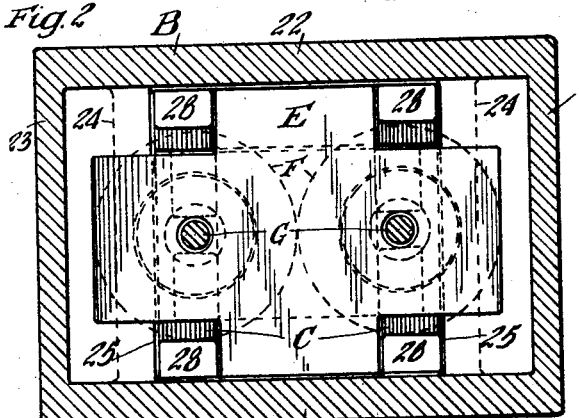
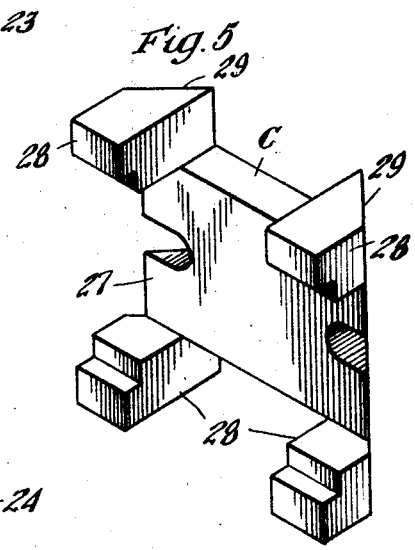
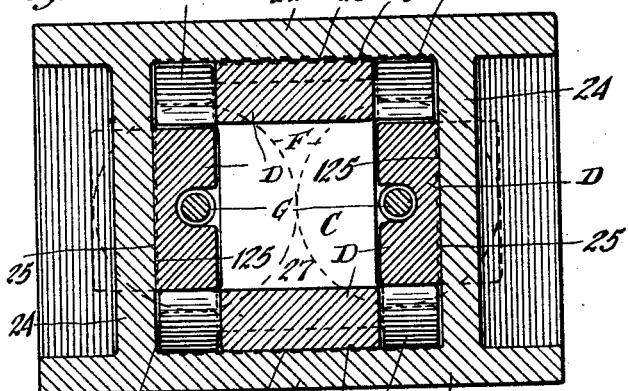
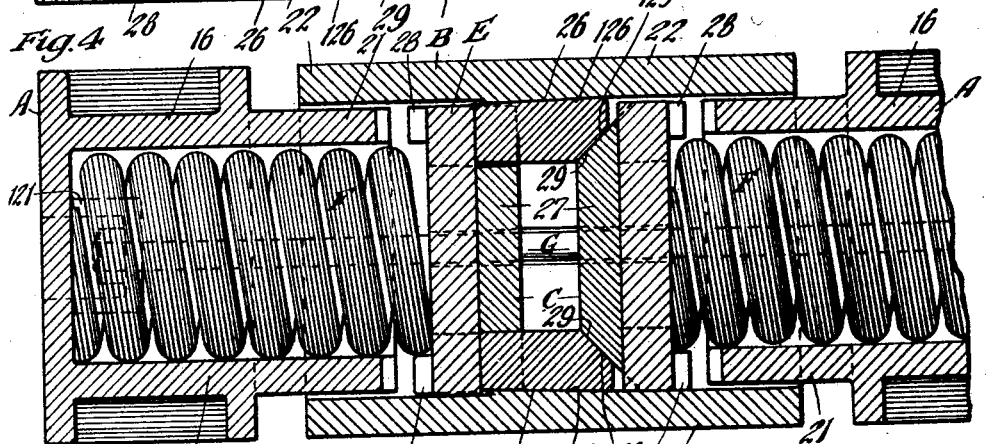
Witnesses
Wm. Geiger
Inventor
John F. O'Connor
By George D. Haight
His Atty.

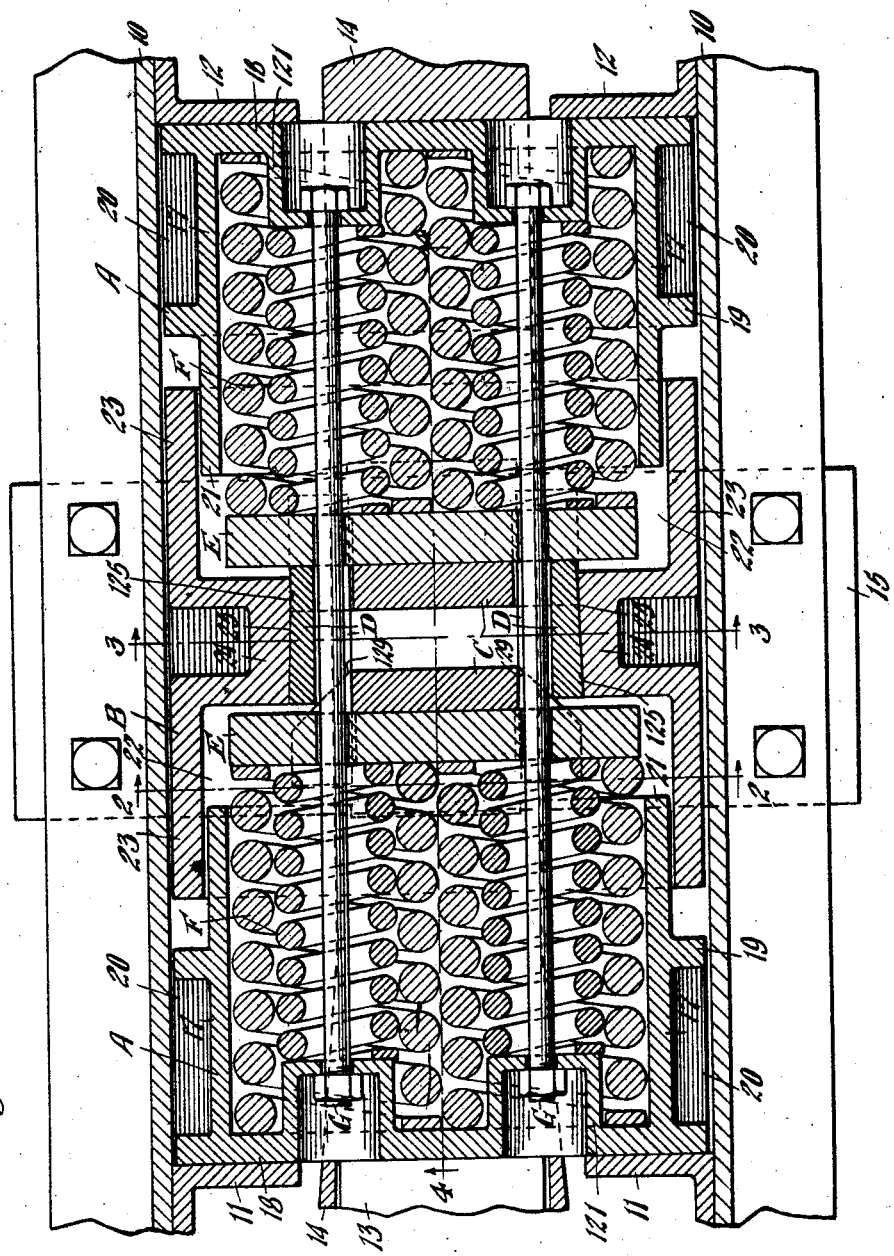

Patented Mar. 27, 1928.

1,663,992

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 21, 1924, Serial No. 727,108. Renewed November 28, 1927.

This invention relates to improvements in friction shock absorbing mechanisms.

One object of this invention is to provide a friction shock absorbing mechanism of high capacity, adapted for railway draft riggings having initial spring action during which the spring resistance elements are partly compressed, and added relatively higher capacity during the remainder of the stroke due to the further compression of the spring resistance elements and added resistance produced by a friction wedge system.

Another object of the invention is to provide a friction shock absorbing mechanism of the character indicated, of the double end type, including relatively movable followers and tandem arranged springs coacting with a pressure transmitting wedge friction system, wherein during the initial compression of the mechanism, the shock is absorbed by the tandem springs, followed by a further compression of the tandem springs during which time the friction wedge system becomes operative to further increase the capacity of the gear, the arrangement being such that the tandem springs are available after each compression stroke to force the coupler to normal position, the main followers being returned to normal position directly by the expansion of the tandem springs, independently of the release of the friction elements.

Other objects and advantages of the invention will more clearly and fully appear from the description and claims hereinafter following.

In the drawings forming a part of this specification, Figure 1 is a longitudinal, horizontal, sectional view of a railway draft rigging, showing my improvements in connection therewith. Figures 2 and 3 are transverse, vertical, sectional views of the shock absorbing mechanism proper, corresponding respectively to the lines 2—2 and 3—3 of Figure 1. Figure 4 is a longitudinal, vertical, sectional view, partly broken away, corresponding substantially to the line 4—4 of Figure 1. And Figure 5 is a detail, perspective view of one of the wedge members employed in connection with my improved mechanism.

In said drawings, 10—10 denote the usual channel-shaped center or draft sills of a railway car underframe, to the inner faces of which are secured front stop lugs 11 and rear stop lugs 12. The inner end portion of a drawbar is designated by 13, to which is operatively attached a hooded yoke 14. Disposed within the yoke is the shock absorbing mechanism proper, including front and rear follower acting members. The movable parts of the draft rigging are operatively supported by a detachable saddle plate 15.

The improved shock absorbing mechanism proper, comprises broadly, front and rear follower casings A—A; a central friction shell B; front and rear wedges C—C; two pairs of friction wedge shoes D—D; front and rear spring followers E—E; tandem arranged twin spring resistance elements F—F; and a pair of retainer bolts G—G.

The front and rear follower casings A which are of like construction, are of box-like form and open at their inner ends. Each follower casing A comprises spaced, longitudinally disposed top and bottom walls 16—16 and spaced, longitudinally disposed side walls 17—17 and a vertically disposed, transverse end wall 18. The end wall 18 is laterally extended beyond the side walls and coacts with the corresponding stop lugs in the manner of a follower. Midway between the opposite ends, the casing A is provided with ribs 19, the ribs of the top and bottom walls extending transversely of the mechanism and the ribs 19 of the side walls extending vertically. Between the ribs 19 and the extended portions of the end wall 18, each casing is provided with longitudinally disposed reinforcing ribs 20. The transverse end wall 18 of each casing also has a pair of inwardly projecting hollow bosses 121, for a purpose hereinafter described, the bosses being disposed midway between the top and bottom of each casing and equally spaced on opposite sides of the longitudinal axis of the mechanism.

The friction shell B, which is also of rectangular box-like form, is open at its opposite ends and has spaced, longitudinally disposed, horizontal top and bottom walls 22—22 and spaced, longitudinally disposed, vertical side walls 23—23. Midway between the ends of the shell B, the side walls 23 are inwardly offset as shown at 24 in Figure 1, presenting longitudinally disposed interior friction surfaces 25, converging slightly rearwardly of the mechanism. Midway between the ends of the shell B, the top and bottom walls 22 are also provided with interior friction surfaces 26—26, the latter converging slightly forwardly of the mechanism. The friction shell is of such a size as to freely receive the inner ends of the casings A, so that the latter will telescope therewithin, as clearly shown in Figures 1 and 4. The parts are so proportioned that the ribs 19 of the front and rear casings A form abutments adapted to engage the opposite ends of the friction shell B to limit the relative movement of the respective follower casings when the mechanism is fully compressed, and cause the force to be transmitted directly through the follower casings and the shell B to the corresponding stop lugs.

The front and rear wedge members C are of substantially similar construction. Each wedge member comprises an elongated, rectangular, plate section 27 having longitudinally disposed block-like portions 28 at the four corners thereof, the front wedge member C being disposed transversely of the mechanism and having the block-like sections disposed respectively at the top and bottom thereof, and the rear wedge member C being vertically disposed and having the block-like sections disposed at the opposite sides thereof. Each wedge member has a pair of wedge faces 29 at the opposite sides thereof, the same converging inwardly of the mechanism. The wedge face at each side of the member C is continuous, the edges of the plate and the corresponding sides of the blocks 28 being cut away on the same planes.

The friction shoes D are four in number, being arranged in pairs, one pair cooperating with the front wedge C and the friction surfaces 25 of the shell B, and the other pair cooperating with the rear wedge C and the friction surfaces 26 of the shell B. The shoes D are all of identical construction, each shoe being provided on the side nearest the axis of the mechanism with a wedge face 129 at one end thereof correspondingly inclined to and adapted to cooperate with one of the wedge faces 29 of one of the wedge members C. On the opposite side, each shoe is provided with a longitudinally disposed, flat friction surface, adapted to cooperate with the corresponding friction surface of the shell, the friction surfaces of the shoes coperating with the side friction surfaces of the shell being designated by 125 and the faces of the shoes cooperating with the top and bottom friction surfaces of the shell being designated by 126.

The front and rear spring followers E are in the form of relatively heavy, flat plates of cruciform outline, as clearly shown in Figure 2. The central portion of each spring follower is adapted to abut the outer surface of the plate-like section 27 of the corresponding wedge member C. The horizontal arms of the rear spring follower are adapted to abut the rear ends of the friction shoes D cooperating with the front wedge C, and the vertical arms of the front spring follower are adapted to abut the front ends of the shoes D cooperating with the rear wedge C.

The spring resistance elements F—F consist of twin arranged front and rear spring units, each unit including an inner, relatively light coil bearing at its outer end on the corresponding boss 121 of one of the follower casings A and bearing at its inner end on the corresponding spring follower E. The inner coil is surrounded by a relatively heavier outer coil having its opposite ends bearing directly on the end wall 18 of the corresponding casing A and the outer surface of the corresponding spring follower E. The two sets of twin units are arranged in tandem, that is, one set of twin units is disposed in back of the other, with the coils of the two sets in longitudinal alignment.

The retainer bolts G are disposed at opposite sides of the longitudinal axis of the mechanism and each bolt has its opposite ends anchored in the corresponding hollow bosses 121 of the front and rear follower casings A. The shank of each bolt extends through aligned openings provided in the spring followers E, wedges C and the shoes D disposed at opposite sides of the mechanism. The retainer bolts G serve to maintain the mechanism of uniform overall length and also hold the parts assembled and under initial compression.

As wear occurs on the various friction and wedge faces, compensation therefor is had due to the expansive action of the front and rear sets of twin springs, which as hereinbefore pointed out, are under initial compression, suitable clearance for this purpose being left between the front ends of the shoes at the sides of the mechanism and the front spring follower E, and between the rear ends of the shoes at the top and bottom of the mechanism and the rear spring follower E.

The operation of the mechanism, assuming an inward or buffing movement of the drawbar, is as follows. As the drawbar moves rearwardly, the front follower casing A is forced rearwardly also, compressing the front pair of twin spring resistance elements F and through the front spring follower E forcing the front wedge C and top and bottom friction shoes D rearwardly, the front wedge C and the said shoes in turn forcing the side shoes D and rear wedge C rearwardly, compressing the rear spring resistance elements F. The two wedges C and the two pairs of shoes D will thus be forced rearwardly substantially as a unit. Due to the friction between the side shoes D and the friction shell B, the latter will be forced rearwardly in unison with the shoes. During this action, the front and rear sets of twin springs will be substantially equally compressed and function in the manner of a double set of twin springs. This action will continue until the inner ends of the top and bottom walls of the front follower will engage the projecting blocks 28 of the front wedge C and the front ends of the top and bottom walls of the rear follower will be engaged by the rear ends of the blocks 28 of the rear wedge C, whereupon the wedges C will be moved relatively to each other in unison with the front and rear follower casings, setting up a pronounced wedging action and also effecting a relative movement of the two pairs of friction wedge shoes coacting with the respective wedges, the shoes in turn carrying the corresponding spring followers E, therewith, causing the latter to be separated, thereby effecting a compression of the springs in tandem.

Due to the converging relation of the side, top and bottom friction surfaces of the shell, there will be a differential wedge action, causing the wedge shoes to move at greater speed than the corresponding wedge member, thus effecting an additional compression of the spring resistance elements.

It will be seen that the resistance during the last described portion of the compression stroke is greatly increased over that had during the initial action of the mechanism, as each set of twin springs are compressed from both ends and to the resistance thus offered is added the friction resistance between the various shoes D and the friction surfaces of the shell. Relative movement of the front and rear follower casings will be limited by the ribs 19 thereof abutting the opposite ends of the friction shell B, as hereinbefore pointed out. Simultaneously with the engagement of the casings A with the shell B, the inner surfaces of the plates 27 of the wedges C will also be brought into abutment with each other. It will be evident that the shell B, front and rear casings A and the wedges C collectively act as a solid column, to transmit the pressure directly to one pair of stop lugs and prevent the front and rear sets of twin springs from being driven solid. In draft, the action of the mechanism is substantially the same as that hereinbefore described, the only difference being that the movement is reversed, the rear follower casing A being moved toward the front follower casing which is held stationary.

Upon reduction of the actuating force, the springs F act to immediately force the casings A apart. As the casings are moved out of engagement with the corresponding wedge members C, the wedging pressure is reduced thereby permitting the springs to restore the two pairs of shoes, the front and rear wedges and the casings A to normal position. It will be evident that the restoration of the front and rear casings is effected independently of any releasing action of the friction wedge system and that, therefore, in case the friction wedge system should not release properly, the spring resistance elements would still be available to absorb the next succeeding shock to which the mechanism is subjected.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with front and rear followers; of a friction shell interposed between said followers, said shell having two sets of opposed, longitudinally arranged interior friction surfaces, one set of said surfaces converging rearwardly of the mechanism and the other set converging forwardly of said mechanism; front and rear wedges adapted to be actuated by the respective followers; front and rear pairs of wedge friction shoes, cooperating with the respective sets of friction surfaces of the shell; and front and rear spring resistance elements cooperating with the respective sets of friction shoes.

2. In a friction shock absorbing mechanism, the combination with front and rear followers; of a friction shell interposed between said followers, said shell having its opposite ends normally spaced from the respective followers and being further provided with interior friction surfaces arranged in oppositely converging pairs; front and rear wedges adapted to be actuated by the respective followers, said wedges being normally spaced from said followers to permit of preliminary action of the mechanism; a pair of wedge friction shoes cooperating with respective friction surfaces of the shell; and front and rear spring resistance elements cooperating with the respective pairs of friction shoes.

3. In a friction shock absorbing mechanism, the combination with front and rear follower acting means; of a friction shell interposed between said follower-acting means, said shell having a plurality of longitudinally disposed, interior flat friction surfaces; two sets of friction shoes cooperating with the shell friction surfaces; tandem arranged springs interposed between said front and rear follower-acting means and co-operating respectively with the two sets of friction shoes; and a wedge engaging each set of friction shoes and cooperating with one of said follower acting means.

4. In a friction shock absorbing mechanism, the combination with front and rear follower acting means; of a rectangular friction shell interposed between said front and rear follower-acting means, said shell having a plurality of longitudinally disposed, interior flat friction surfaces; tandem arranged springs interposed between said follower acting means; a spring follower cooperating with each spring; two sets of friction shoes cooperating with the shell friction surfaces, each set cooperating with one of said spring followers; and a wedge engaging the friction shoes of each set and cooperating with one of said main follower acting means.

5. In a friction shock absorbing mechanism, the combination with front and rear followers relatively movable toward and away from each other; of two sets of twin arranged springs, said sets being arranged in tandem, said tandem arranged springs being interposed between said followers, one of said sets of springs being associated with each follower; a wedge-pressure transmitting member co-acting with each follower; friction wedge shoes co-acting with each wedge pressure transmitting member and adapted to be moved by the latter upon relative movement of the front and rear followers to apply pressure to the inner ends of the tandem springs; and a lateral pressure resisting member cooperating with said shoes.

In witness that I claim the foregoing I have hereunto subscribed my name this 15th day of July, 1924.

JOHN F. O'CONNOR.